United States Patent
Smith et al.

(10) Patent No.: US 11,243,652 B2
(45) Date of Patent: Feb. 8, 2022

(54) TEAM KNOWLEDGE SHARING

(71) Applicant: Affirm, Inc., San Francisco, CA (US)

(72) Inventors: Adam Smith, San Francisco, CA (US); Tarak Upadhyaya, San Francisco, CA (US); Juan Lozano, San Francisco, CA (US); Daniel Hung, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 65 days.

(21) Appl. No.: 16/664,336

(22) Filed: Oct. 25, 2019

(65) Prior Publication Data

US 2020/0133441 A1    Apr. 30, 2020

Related U.S. Application Data

(60) Provisional application No. 62/750,266, filed on Oct. 25, 2018.

(51) Int. Cl.
| | | |
|---|---|---|
| *G06F 3/0481* | (2013.01) | |
| *G06N 5/04* | (2006.01) | |
| *G06F 16/25* | (2019.01) | |
| *G06F 16/23* | (2019.01) | |
| *G06F 16/22* | (2019.01) | |
| *G06F 16/242* | (2019.01) | |
| *G06F 16/2457* | (2019.01) | |
| *G06F 16/248* | (2019.01) | |
| *G06F 11/30* | (2006.01) | |
| *G06F 11/34* | (2006.01) | |

(Continued)

(52) U.S. Cl.
CPC ......... *G06F 3/0481* (2013.01); *G06F 11/302* (2013.01); *G06F 11/3438* (2013.01); *G06F 16/2246* (2019.01); *G06F 16/2379* (2019.01); *G06F 16/244* (2019.01); *G06F 16/248* (2019.01); *G06F 16/24573* (2019.01); *G06F 16/24575* (2019.01); *G06F 16/252* (2019.01); *G06F 16/258* (2019.01); *G06N 5/04* (2013.01); *G06N 20/00* (2019.01); *G06F 8/30* (2013.01); *G06F 9/44526* (2013.01)

(58) Field of Classification Search
CPC ............ G06N 5/022; G06N 5/02; G06N 5/04; G06N 20/00; G06N 20/10; G06N 20/20; G06F 8/73
USPC ......................................................... 717/122
See application file for complete search history.

(56) References Cited

U.S. PATENT DOCUMENTS 7,860,815 B1 * 12/2010 Tangirala ................. G06N 5/02
706/45
8,566,789 B2 * 10/2013 Siddarामappa ........ G06F 16/80
717/110

(Continued)

*Primary Examiner* — Mong-Shune Chung
(74) *Attorney, Agent, or Firm* — Burr & Forman, LLP

(57) ABSTRACT

Disclosed systems and methods relate to a knowledge sharing system for aggregating and disseminating knowledge related to programming. The knowledge system for aggregating and disseminating knowledge related to programming may organize or index knowledge according to topics. A topic may be any kind of transferrable piece of knowledge that may be shared. In some embodiments, knowledge organized under a topic may be comprised of a record of interactions with computing systems, and in some embodiments, knowledge organized under a topic may be comprised of text documents, code samples, documentation, web sites, records of discussions, or other kinds of reference materials.

10 Claims, 11 Drawing Sheets

(51) Int. Cl.
  *G06N 20/00* (2019.01)
  *G06F 8/30* (2018.01)
  *G06F 9/445* (2018.01)

(56) References Cited

U.S. PATENT DOCUMENTS

| | | | |
|---|---|---|---|
| 10,360,023 B2* | 7/2019 | Cowan | G06F 8/71 |
| 2012/0297363 A1* | 11/2012 | Perisic | G06F 8/71 |
| | | | 717/122 |
| 2014/0075364 A1* | 3/2014 | Bragdon | G06F 8/33 |
| | | | 715/772 |
| 2018/0276103 A1* | 9/2018 | Woulfe | G06F 11/362 |

* cited by examiner

TEAM KNOWLEDGE SHARING

CROSS-REFERENCE TO RELATED APPLICATIONS

This application claims the benefit of U.S. Provisional Patent Application No. 62/750,266, filed Oct. 25, 2018, which is hereby incorporated by reference in its entirety.

FIELD OF INVENTION

The present disclosure relates generally to methods and systems for gathering, storing, organizing, and sharing knowledge during software programming and development.

BACKGROUND

Programmers may consult various sources of knowledge or information in the course of writing or authoring software. For example, written communication between team members such as email messages and chat messages may be referenced by programmers. Team-maintained documentation about a code repository such as documentation in a code repository, system design documents, product specification documents, team guidelines, or standards may all be sources of knowledge consulted by programmers during programming. In addition, wikis, question and answer platforms such as StackOverflow or Quora, discussion forums, or other internet sources may also be consulted by programmers during programming. Programmers may attempt to keep documentation sources up to date, but such documentation sources may become stale over time if not frequently updated.

SUMMARY

In some embodiments, a programming co-pilot system is provided that may integrate with a code editor. The programming co-pilot system may provide functionality such as gathering knowledge, aggregating sources of knowledge, storing and organizing that knowledge, and making that knowledge accessible through a variety of interfaces and touchpoints. A knowledge sharing system may make information more accessible and organized. Furthermore, some embodiments of the knowledge sharing system may enable automatic discovery and storage of knowledge through various automatic mechanisms.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: monitoring accesses of source code in a source code editor; recording the accesses in an electronic journal in a time-series format including sequential data, where the accesses include at least an edit event, a navigation event, and a selection event; receiving a request to compile the source code; compiling the source code; monitoring a result of execution of the source code; storing the result of execution of the source code in the electronic journal. Other embodiments of this aspect include corresponding computer systems, apparatus, and computer programs recorded on one or more computer storage devices, each configured to perform the actions of the methods.

Implementations may include one or more of the following features. The computer-implemented method where the monitoring edits in a source code editor is performed by an editor plug-in. The computer-implemented method where the monitoring edits of source code in a source code editor is performed on source code that has not been checked in to a central repository. Implementations of the described techniques may include hardware, a method or process, or computer software on a computer-accessible medium.

One general aspect includes a computer-implemented method including: monitoring inputs in an operating system terminal, monitoring outputs in an operating system terminal, parsing commands input by a user into the operating system terminal to extract a command type and zero or more parameters, parsing outputs in the operating system terminal to determine successful completion of the commands or an error, storing the parsed commands input by the user and parsed outputs in an electronic journal. Other embodiments of this aspect include corresponding computer systems, apparatus, and computer programs recorded on one or more computer storage devices, each configured to perform the actions of the methods.

Implementations may include one or more of the following features. The computer-implemented method further including: parsing the commands input by the user into an abstract syntax tree. The computer-implemented method further including: determining successful completion of the commands or an error based on a return code. Implementations of the described techniques may include hardware, a method or process, or computer software on a computer-accessible medium.

One general aspect includes a computer-implemented method including: receiving a request to check out code from a remote code repository. The computer-implemented method also includes checking out code from the remote code repository to a local computer of a user and storing the checked out code as a local version. The computer-implemented method also includes monitoring edits to the local version. The computer-implemented method also includes recording the edits to the local version in an electronic journal in a time-series format including sequential data, where the edits include at least an edit event, a navigation event, and a selection event. The computer-implemented method also includes displaying the edits to the local version to other users, prior to a checking in of the local version to the remote code repository. Other embodiments of this aspect include corresponding computer systems, apparatus, and computer programs recorded on one or more computer storage devices, each configured to perform the actions of the methods.

One general aspect includes a computer-implemented method including: retrieving from a database time-series information about one or more edits made to source code, identifying one or more topics for the edit based on a code entity included in the edit, identifying one or more topics for the edit based on a parameter included in the edit, storing an indication of a hierarchical relationship between one or more topics, displaying the time-series information and the one or more topics to a user. Other embodiments of this aspect include corresponding computer systems, apparatus, and computer programs recorded on one or more computer storage devices, each configured to perform the actions of the methods.

Implementations may include one or more of the following features. The computer-implemented method further including: displaying a user interface element for the user to add user-edited information about one or more topics. The computer-implemented method further including: displaying a user interface for editing the time-series information about one or more edits made to source code; identifying data in the time-series information as sensitive based on a prediction from a machine learning model; highlighting the data identified as sensitive. The computer-implemented method further including: computing an expected utility of prompting the user for entry of additional information about one or more topics; where the expected utility is based on the frequency that the topic is encountered by other users, the frequency that the topic is viewed by other users, the amount of existing information on the topic, the rate at which users contribute to the topic when prompted, or a computed value of the time of the user; when the expected utility exceeds a threshold, displaying a user interface element for the user to add user-edited information about the one or more topics. Implementations of the described techniques may include hardware, a method or process, or computer software on a computer-accessible medium.

One general aspect includes a computer-implemented method including: retrieving from a database time-series information about a command entered in a terminal, where the command is multi-layered; parsing the command into one or more layers; identifying one or more topics for the command based on the layers; storing an indication of a hierarchical relationship between the one or more topics; displaying the time-series information and the one or more topics to a user. Other embodiments of this aspect include corresponding computer systems, apparatus, and computer programs recorded on one or more computer storage devices, each configured to perform the actions of the methods.

Implementations may include one or more of the following features. The computer-implemented method further including: displaying a user interface element for the user to add user-edited information about the one or more topics. The computer-implemented method further including: displaying a user interface for editing the time-series information about a command entered in the terminal; identifying data in the time-series information as sensitive based on a prediction from a machine learning model; highlighting the data identified as sensitive. The computer-implemented method further including: computing an expected utility of prompting the user for entry of additional information about the one or more topics; where the expected utility is based on the frequency that the topic is encountered by other users, the frequency that the topic is viewed by other users, the amount of existing information on the topic, the rate at which users contribute to the topic when prompted, or a computed value of the time of the user; when the expected utility exceeds a threshold, displaying a user interface element for the user to add user-edited information about the one or more topics. Implementations of the described techniques may include hardware, a method or process, or computer software on a computer-accessible medium.

One general aspect includes a computer-implemented method including: monitoring inputs in an operating system terminal, monitoring outputs in an operating system terminal, parsing a plurality of commands input by a user into the operating system terminal to extract one or more commands types and parameters, storing the parsed commands input by the user and parsed outputs in an electronic journal, identifying commands that co-occur more frequently than a threshold occurrence rate, grouping the co-occurring commands, inferring a topic for the co-occurring commands using a machine learning model, displaying the topic to the user. Other embodiments of this aspect include corresponding computer systems, apparatus, and computer programs recorded on one or more computer storage devices, each configured to perform the actions of the methods.

Implementations may include one or more of the following features. The computer-implemented method further including: displaying a user interface element for the user to add user-edited information about the topic. The computer-implemented method further including: displaying a user interface for editing the plurality of commands; identifying data in the plurality of commands as sensitive based on a prediction from a machine learning model; highlighting the data identified as sensitive. The computer-implemented method further including: computing an expected utility of prompting the user for entry of additional information about the topic; where the expected utility is based on the frequency that the topic is encountered by other users, the frequency that the topic is viewed by other users, the amount of existing information on the topic, the rate at which users contribute to the topic when prompted, or a computed value of the time of the user; when the expected utility exceeds a threshold, displaying a user interface element for the user to add user-edited information about the topic. Implementations of the described techniques may include hardware, a method or process, or computer software on a computer-accessible medium.

One general aspect includes a computer-implemented method including: aggregating data from a plurality of data sources, the data sources including content about a codebase; the plurality of data sources including at least a record of changes in the codebase, text documentation about the codebase, a crowd-sourced information source about the codebase, communication channels such as email or chat that is used to discuss the codebase, a project management data source about the codebase, or analytics about the performance of the codebase; grouping the aggregated data into at least one topic; displaying the at least one topic to a user. Other embodiments of this aspect include corresponding computer systems, apparatus, and computer programs recorded on one or more computer storage devices, each configured to perform the actions of the methods.

Implementations may include one or more of the following features. The computer-implemented method further including: displaying a user interface element for the user to add user-edited information about at least one topic. The computer-implemented method where the grouping of aggregated data into at least one topic is performed based on references to a common code entity. The computer-implemented method where the grouping of aggregated data into at least one topic is performed based on keywords. The computer-implemented method where the plurality of data sources includes an electronic journal storing time-series information about one or more terminal commands entered by other users, editor events, and other data sources described herein. Implementations of the described techniques may include hardware, a method or process, or computer software on a computer-accessible medium.

One general aspect includes a computer-implemented method including: retrieving a topic about a codebase; determining an expertise level of a plurality of users based on at least authorship of code or documentation related to the topic, frequency of code pull requests related to the topic, frequency of team communications about the topic, frequency of code submissions related to the topic, length of time involved in the topic, or number of subtopics of the topic that the user is involved in; determining that at least one user of the plurality of users is an expert in the topic based the at least one user having an expertise level exceeding a threshold; displaying an identifier of the at least one user determined to be an expert in the topic. Other embodiments of this aspect include corresponding computer systems, apparatus, and computer programs recorded on one or more computer storage devices, each configured to perform the actions of the methods.

One general aspect includes a computer-implemented method including: monitoring inputs in an operating system terminal, monitoring outputs in the operating system terminal, detecting an error output in the operating system terminal, determining related topics based on the inputs and outputs, displaying information about the related topic to a user. Other embodiments of this aspect include corresponding computer systems, apparatus, and computer programs recorded on one or more computer storage devices, each configured to perform the actions of the methods.

One general aspect includes a computer-implemented method including: displaying a topic of information to a user, where the topic includes information about a codebase; displaying information about a plurality of other users, including an expertise level of each other user in the topic, an indication of whether the other user is occupied with a task and the priority level of the task, and whether the other user is working on portion of a codebase that is identical to a portion of the codebase being worked on by the user; displaying a user interface element for contacting one or more of the plurality of other users. Other embodiments of this aspect include corresponding computer systems, apparatus, and computer programs recorded on one or more computer storage devices, each configured to perform the actions of the methods.

One general aspect includes a computer-implemented method including: displaying a topic of information to a user, where the topic includes information about a codebase; receiving a request from the user to receive notifications about the topic; monitoring for changes to the topic; when a change to the topic is detected, sending a notification to the user. Other embodiments of this aspect include corresponding computer systems, apparatus, and computer programs recorded on one or more computer storage devices, each configured to perform the actions of the methods.

Implementations may include one or more of the following features. The computer-implemented method where the change to the topic that is detected is a change to code in a codebase. Changes may include, for example, increases in terminal events, increases in activity as measured by analytics monitors, increases in code repository issues being filed, and so on. The computer-implemented method where the notification to the user is an update to a newsfeed. Implementations of the described techniques may include hardware, a method or process, or computer software on a computer-accessible medium.

One general aspect includes a computer-implemented method including: monitoring edits to source code in a source code editor by a user and other data sources described herein; aggregating the edits into topics based on code entities or keywords; outputting recommendations of topics for the user to write documentation about, where the recommendations are based on the frequency that the topic is viewed by other users, the amount of time that other users spend viewing the topic, the amount of content that exists in the topic, or the number of other users with expertise in the topic. Other embodiments of this aspect include corresponding computer systems, apparatus, and computer programs recorded on one or more computer storage devices, each configured to perform the actions of the methods.

BRIEF DESCRIPTION OF THE DRAWINGS

The present disclosure will become better understood from the detailed description and the drawings, wherein.

DETAILED DESCRIPTION

Figure 1:
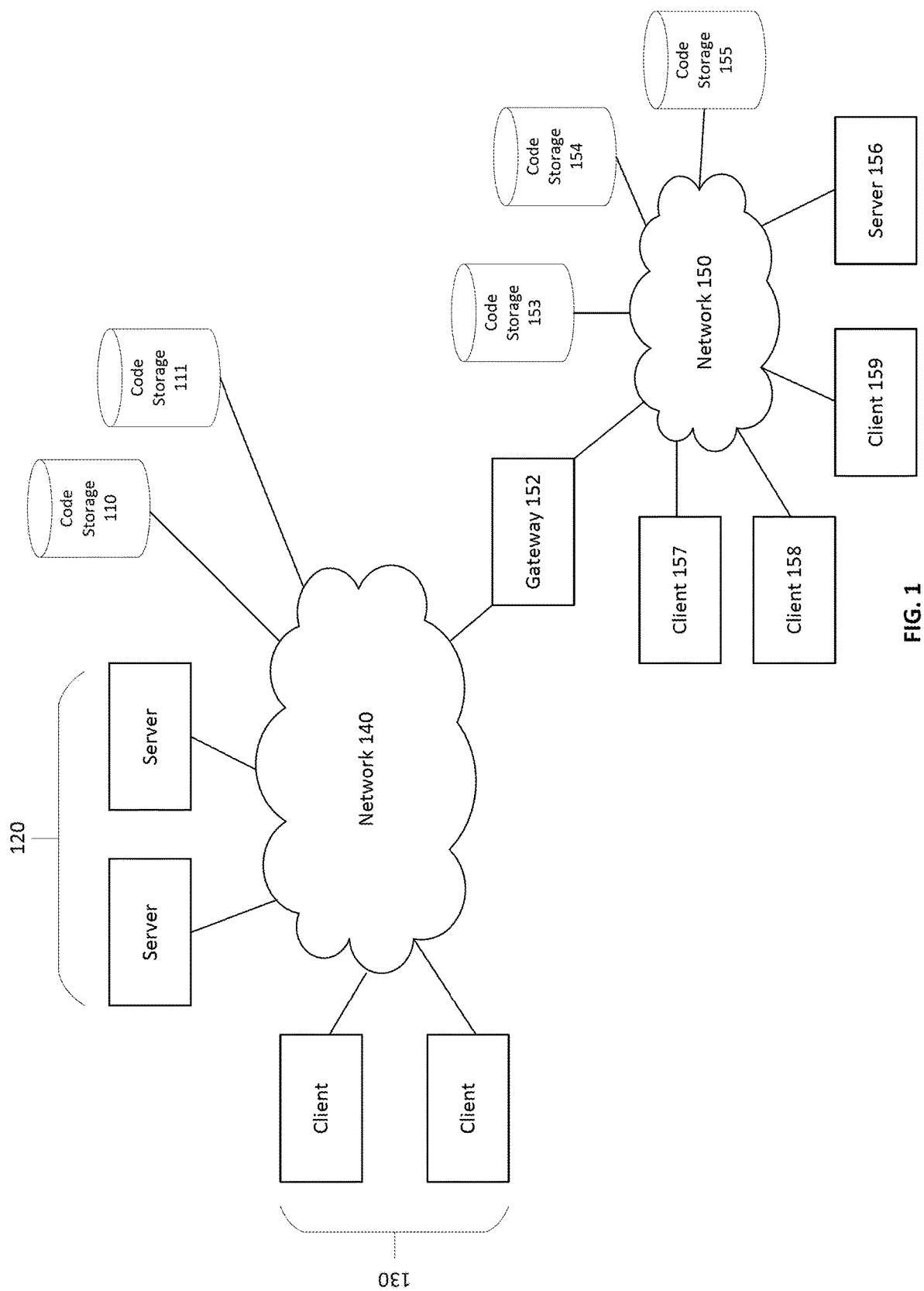
FIG. 1 is a block diagram illustrating an exemplary network environment that may be used in an embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a block diagram illustrating an exemplary network environment that may be used in an embodiment. The network environment may include one or more clients and servers connected via a network 140. The network 140 may include a local area network (LAN), a wide area network (WAN), a telephone network, such as the Public Switched Telephone Network (PSTN), an intranet, the Internet, or a combination of networks. The network may include external code storage 110, 111 that store computer code, such as source code. Some external code storage 110, 111 may be globally accessible to any entity on the network 140. Other external code storage 110, 111 may be private and require login-in and authentication to access. The network 140 may include various entities such as servers 120 and clients 130.

Local network 150 may connect to network 140 through gateway 152. In some embodiments, the local network 150 may be private and access controlled so that entities on the network 140 cannot generally access the resources on local network 140. However, entities on the local network 150 may access and share at least some of the resources on the local network 150. Code storage 153 may comprise code stored on the local network 150 after having been web scraped from external code sources 110, 111. Code storage 154 may exist on the local network 150 and may store code from a team of programmers working from clients 157, 158, 159 on the local network 150. In an embodiment, a code storage 155 is an individual code storage that stores code of just one of the programmers on the team. The code storage 155 may be separate from code storage 154 or may be, for example, a subset of code storage 154. Code storage may be any kind of storage. In some embodiments, a code storage comprise a codebase, which is a collection of code for building one or a set of software systems, applications, or software components. Moreover, in some embodiments, a codebase comprises a code repository, where a repository keeps track of changes in the codebase over time and may allow version control and allowing checking in and checking out of code. In some embodiments, code storage comprises a database. A database is any kind of storage and no particular type of database is required. For example, a database may comprise storage of files in memory or permanent storage. Server 156 may exist on the local network 150 and run a program comprised of code from the team of programmers. The code may be team code stored in code storage 154 or an individual branch or subset stored on code storage 155. Server 156 may generate logs or output during the execution of the program, and the logs or output may be retrieved by clients 157, 158, 159 for monitoring or debugging of the program.

Additional servers, clients, computer systems, and local networks may be connected to network 140. It should be understand that where the terms server, client, or computer system are used, this includes the use of networked arrangements of multiple devices operating as a server, client, or computer system. For example, distributed or parallel computing may be used.

Figure 2A:
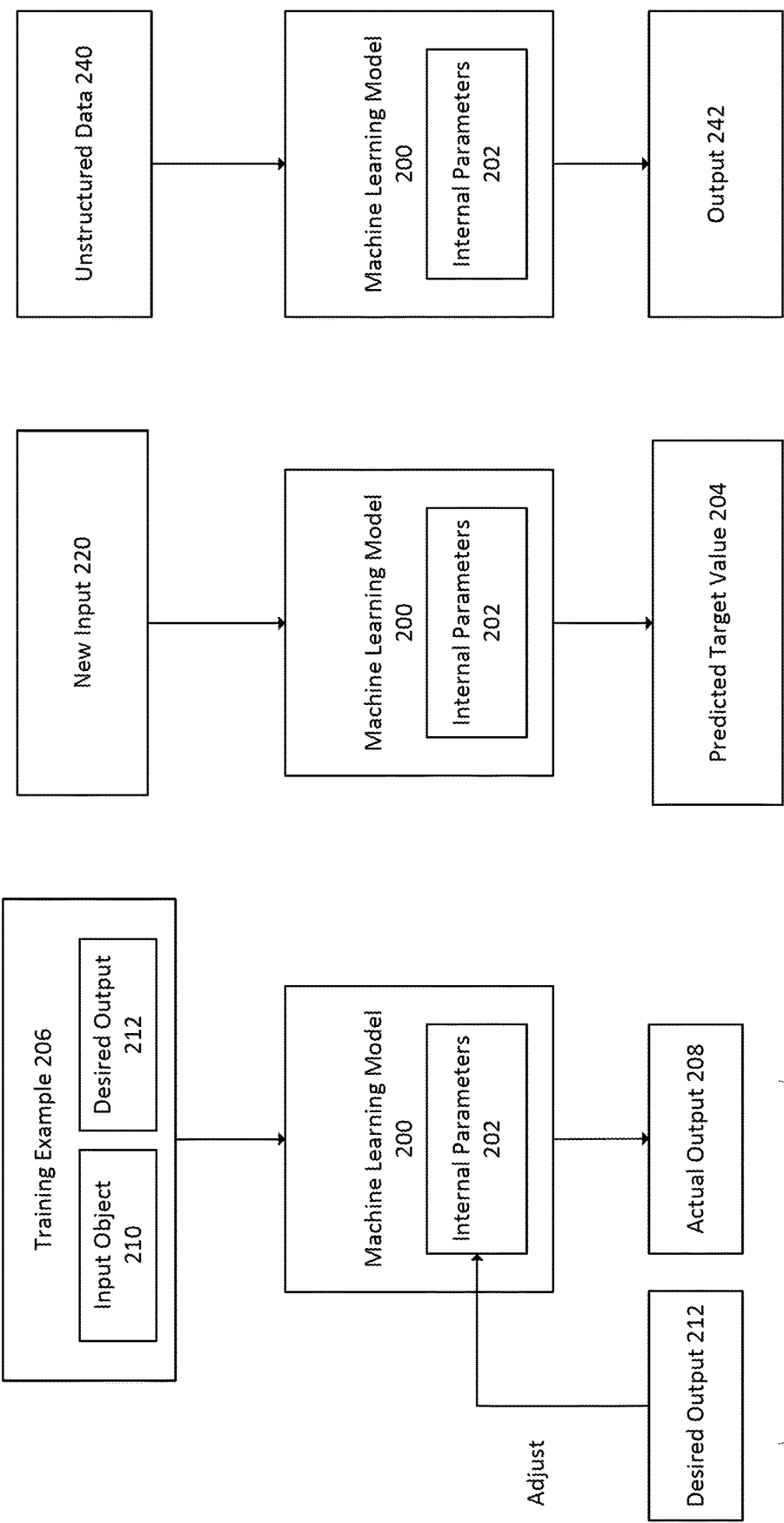
FIG. 2A illustrates an exemplary machine learning model according to an embodiment.

FIG. 2A illustrates an exemplary machine learning model 200. A machine learning model 200 may be a component, module, computer program, system, or algorithm. Some embodiments herein use machine learning for code completion, predictive editing, or predictive navigation. Machine learning model 200 may be used as the model to power those embodiments described herein. In some embodiments, machine learning model 200 uses supervised learning. In such an embodiment, machine learning model 200 is trained with training examples 206, which may comprise an input object 210 and a desired output value 212. The input object 210 and desired object value 212 may be tensors. A tensor is a matrix of n dimensions where n may be any of 0 (a constant), 1 (an array), 2 (a 2D matrix), 3, 4, or more.

The machine learning model 200 has internal parameters that determine its decision boundary and that determine the output that the machine learning model 200 produces. After each training iteration, comprising inputting the input object 210 of a training example in to the machine learning model 200, the actual output 208 of the machine learning model 200 for the input object 210 is compared to the desired output value 212. One or more internal parameters 202 of the machine learning model 200 may be adjusted such that, upon running the machine learning model 200 with the new parameters, the produced output 208 will be closer to the desired output value 212. If the produced output 208 was already identical to the desired output value 212, then the internal parameters 202 of the machine learning model 200 may be adjusted to reinforce and strengthen those parameters that caused the correct output and reduce and weaken parameters that tended to move away from the correct output.

The machine learning model 200 output may be, for example, a numerical value in the case of regression or an identifier of a category in the case of classifier. A machine learning model trained to perform regression may be referred to as a regression model and a machine learning model trained to perform classification may be referred to as a classifier. The aspects of the input object that may be considered by the machine learning model 200 in making its decision may be referred to as features.

After machine learning model 200 has been trained, a new, unseen input object 220 may be provided as input to the model 200. The machine learning model 200 then produces an output representing a predicted target value 204 for the new input object 220, based on its internal parameters 202 learned from training.

Machine learning model 200 may be, for example, a neural network, support vector machine (SVM), Bayesian network, logistic regression, logistic classification, decision tree, ensemble classifier, or other machine learning model. Machine learning model 200 may be supervised or unsupervised. In the unsupervised case, the machine learning model 200 may identify patterns in the unstructured data 240 without training examples 206. Unstructured data 240 is, for example, raw data upon which inference processes are desired to be performed. An unsupervised machine learning model may generate output 242 that comprises data identifying structure or patterns.

A neural network may be comprised of a plurality of neural network nodes, where each node includes input values, a set of weights, and an activation function. The neural network node may calculate the activation function on the input values to produce an output value. The activation function may be a non-linear function computed on the weighted sum of the input values plus an optional constant. In some embodiments, the activation function is logistic, sigmoid, or a hyperbolic tangent function. Neural network nodes may be connected to each other such that the output of one node is the input of another node. Moreover, neural network nodes may be organized into layers, each layer comprising one or more nodes. An input layer may comprise the inputs to the neural network and an output layer may comprise the output of the neural network. A neural network may be trained and update its internal parameters, which comprise the weights of each neural network node, by using backpropagation.

A convolutional neural network (CNN) may be used in some embodiments and is one kind of neural network and machine learning model. A convolutional neural network may include one or more convolutional filters, also known as kernels, that operate on the outputs of the neural network layer that precede it and produce an output to be consumed by the neural network layer subsequent to it. A convolutional filter may have a window in which it operates. The window may be spatially local. A node of the preceding layer may be connected to a node in the current layer if the node of the preceding layer is within the window. If it is not within the window, then it is not connected. A convolutional neural network is one kind of locally connected neural network, which is a neural network where neural network nodes are connected to nodes of a preceding layer that are within a spatially local area. Moreover, a convolutional neural network is one kind of sparsely connected neural network, which is a neural network where most of the nodes of each hidden layer are connected to fewer than half of the nodes in the subsequent layer.

A recurrent neural network (RNN) may be used in some embodiments and is one kind of neural network and machine learning model. A recurrent neural network includes at least one back loop, where the output of at least one neural network node is input into a neural network node of a prior layer. The recurrent neural network maintains state between iterations, such as in the form of a tensor. The state is updated at each iteration, and the state tensor is passed as input to the recurrent neural network at the new iteration.

In some embodiments, the recurrent neural network is a long short-term (LSTM) memory neural network. In some embodiments, the recurrent neural network is a bi-directional LSTM neural network.

A feed forward neural network is another type of a neural network and has no back loops. In some embodiments, a feed forward neural network may be densely connected, meaning that most of the neural network nodes in each layer are connected to most of the neural network nodes in the subsequent layer. In some embodiments, the feed forward neural network is a fully-connected neural network, where each of the neural network nodes is connected to each neural network node in the subsequent layer.

A gated graph sequence neural network (GGSNN) is a type of neural network that may be used in some embodiments. In a GGSNN, the input data is a graph, comprising nodes and edges between the nodes, and the neural network outputs a graph. The graph may be directed or undirected. A propagation step is performed to compute node representations for each node, where node representations may be based on features of the node. An output model maps from node representations and corresponding labels to an output for each node. The output model is defined per node and is a differentiable function that maps to an output.

Neural networks of different types or the same type may be linked together into a sequential or parallel series of neural networks, where subsequent neural networks accept as input the output of one or more preceding neural networks. The combination of multiple neural networks may comprise a single neural network and may be trained from end-to-end using backpropagation from the last neural network through the first neural network.

Figure 2B:
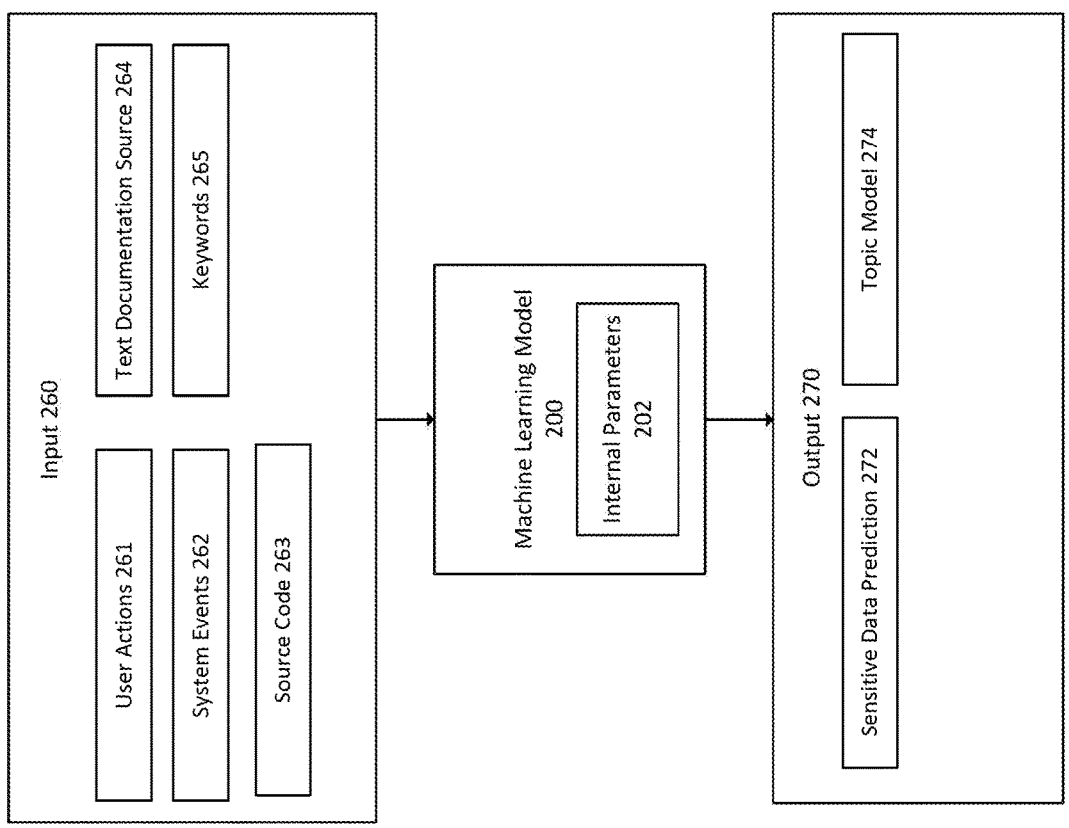
FIG. 2B illustrates use of a machine learning model to perform inference on input comprising data relevant to a programming co-pilot system.

FIG. 2B illustrates use of the machine learning model 200 to perform inference on input 260 comprising data relevant to a programming co-pilot system 340. Input 260 may comprise any of user actions 261, system events 262, source code 263 such as in external code storage, team code storage, or personal code storage, text documentation source 264 that relates to source code 263, keywords 265, or other data. The machine learning model 200 performs inference on the data based on its internal parameters 202 that are learned through training. The machine learning model 200 generates an output 270 comprising information or data relevant to helping a programmer, such as a sensitive data prediction 272 or topic model 274.

Figure 3:
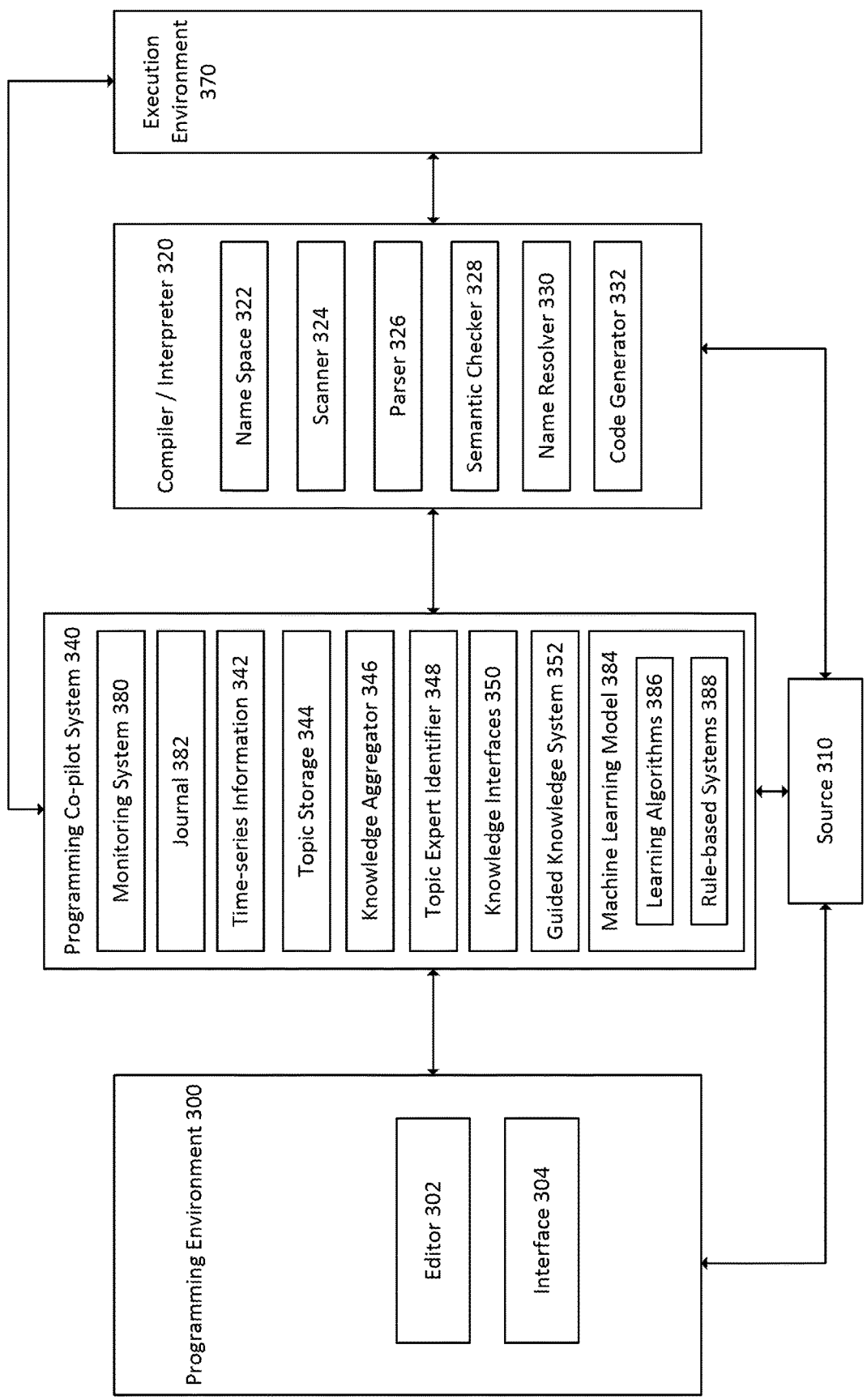
FIG. 3 illustrates an exemplary system for software development.

FIG. 3 illustrates an exemplary system for software development. Source code 310 may be provided and edited in a programming environment 300. The programming environment may allow interactive editing of the source code 310 by a user, such as a programmer. A programming environment may include an editor 302 and an interface 304. The editor 302 may provide for the developing, such as writing and editing, of source code 310. The interface 304 may present a human viewable or usable interface for using the editor 302. For example, the interface 304 may comprise a graphical user interface. Many different kinds of editor 302 may be used such as an integrated development environment (IDE), text editor, or command line. In some embodiments, an IDE such as Eclipse, Sublime, Atom, or Visual Studio may be used. In other embodiments, a shell or operating command line such as the Bash command line is used as a programming environment and may comprise an editor 302. In still other embodiments, single input interactive environments, such as Read-Eval-Print Loop (REPL), may be used as the editor 302.

A compiler or interpreter 320 may compile the code 310 into executable instructions or an intermediate representation, or interpret the source code 310 for execution. The compiler/interpreter 320 may comprise a namespace 322 that can be used to store symbols, such as identifiers and types, and to allow for name resolution 330. In some embodiments, the compiler/interpreter 320 may comprise a scanner 324, parser 326, semantic checker 328, name resolver 330, and code generator 332. Scanner 324 may accept as input the source code 310 and split expressions and language statements into tokens that can be processed by the parser 326 to determine the grammatical structure of a program. A token may be a single element of a programming language such as a constant, identifier, operator, separator, reserved word, or other element. In some embodiments, a token is atomic and is the smallest semantic unit of a programming language, such that the token cannot be broken down further into units with semantic meaning in the language. The parser 326 may parse the tokens and organize them according to a grammar of a programming language. In some embodiments, parser 326 builds a parse tree. Semantic checker 328 may perform semantic checking of a computer program and may identify and throw errors that are semantic in nature. The name resolver 330 may resolve names in the parse tree to elements of the namespace 322. Code generator 332 may translate the parse tree, or other intermediate representation of the source code, into a target language. The target language may be executable instructions, such as a binary executable, or an intermediate language that may be interpreted for execution. In an execution environment 370, code may be executed, such as for testing or production.

Programming co-pilot system 340 may interact with the programming environment 300, source code 310, compiler/interpreter 320, and execution environment 370 to provide programming assistance to the programmer. Programming co-pilot 340 may include a monitoring system 380 to monitor user actions in running applications such as a web browser, terminal, or an editor 302 and system events such as inputs, outputs, errors, and file-system changes. Programming co-pilot 340 may also include a journal 382, which may comprise a digital record of the history of data, such as sequential changes to and versions of source code, user interactions in the editor 302, user interactions in other parts of a system such as a terminal or web browser, system events, and other data. The journal 382 may record data sequentially so that a sequence of events may be exactly reconstructed. Programming co-pilot 340 may include functionalities such as data storage for time-series information 342, topic storage 344, knowledge aggregator 346, topic expert identifier 348, knowledge interfaces 350, guided knowledge system 352, and other functionalities. Programming co-pilot 340 may include machine learning model 384 to power its functionality, including learning algorithms 386 that learn from data or rule-based systems 388 that use hard-coded rules or heuristics. Although illustrated as one unit, multiple machine learning models 384 may be used in practice to perform or implement different functionality. For example, each function may have a separate machine learning model. Programming co-pilot system 340 may interface with the programming environment 300 through API calls, data streams, inter-process messages, shared data structures, or other methods. In some embodiments, the programming co-pilot 340 is a separate program from the programming environment 300. In other embodiments, the programming co-pilot is a sub-program or component of the programming environment 300.

An embodiment of a programming co-pilot system 340 and its various functionality will be described herein. The programming co-pilot system 340 may include various combinations of the features described herein. In some embodiments, it includes all the functionalities described herein, and, in other embodiments, it includes only a subset of the functionalities described.

Embodiments may operate on any kind of source code including imperative programming languages, declarative code, markup languages, scripting languages. and other code. For example, source code may be Python, Perl, PHP, Javascript, Java, C, C++, HTML, reStructuredText, Markdown, CSS, shell scripts (such as bash, zsh, etc.), and so on.

A. Knowledge Sharing

In some embodiments, programming co-pilot system 340 includes a knowledge sharing system for aggregating and disseminating knowledge related to programming. The knowledge system for aggregating and disseminating knowledge related to programming may organize or index knowledge according to topics. A topic may be any kind of transferrable piece of knowledge that may be shared. Topics may include, for example, a terminal command, error, fix for an error, code entity, function, module, codebase, or any other type of information element. In some embodiments, knowledge organized under a topic may be comprised of a record of interactions with computing systems, and in some embodiments, knowledge organized under a topic may be comprised of text documents, code samples, documentation, web sites, records of discussions, or other kinds of reference materials. A topic may then represent a high-level concept that describes or is related to all knowledge organized under the topic. In some embodiments discussed in more detail below, knowledge may be automatically recorded, determined, or gathered. In some embodiments discussed in more detail below, knowledge may be manually entered, tagged, or associated to a topic.

Figure 4:
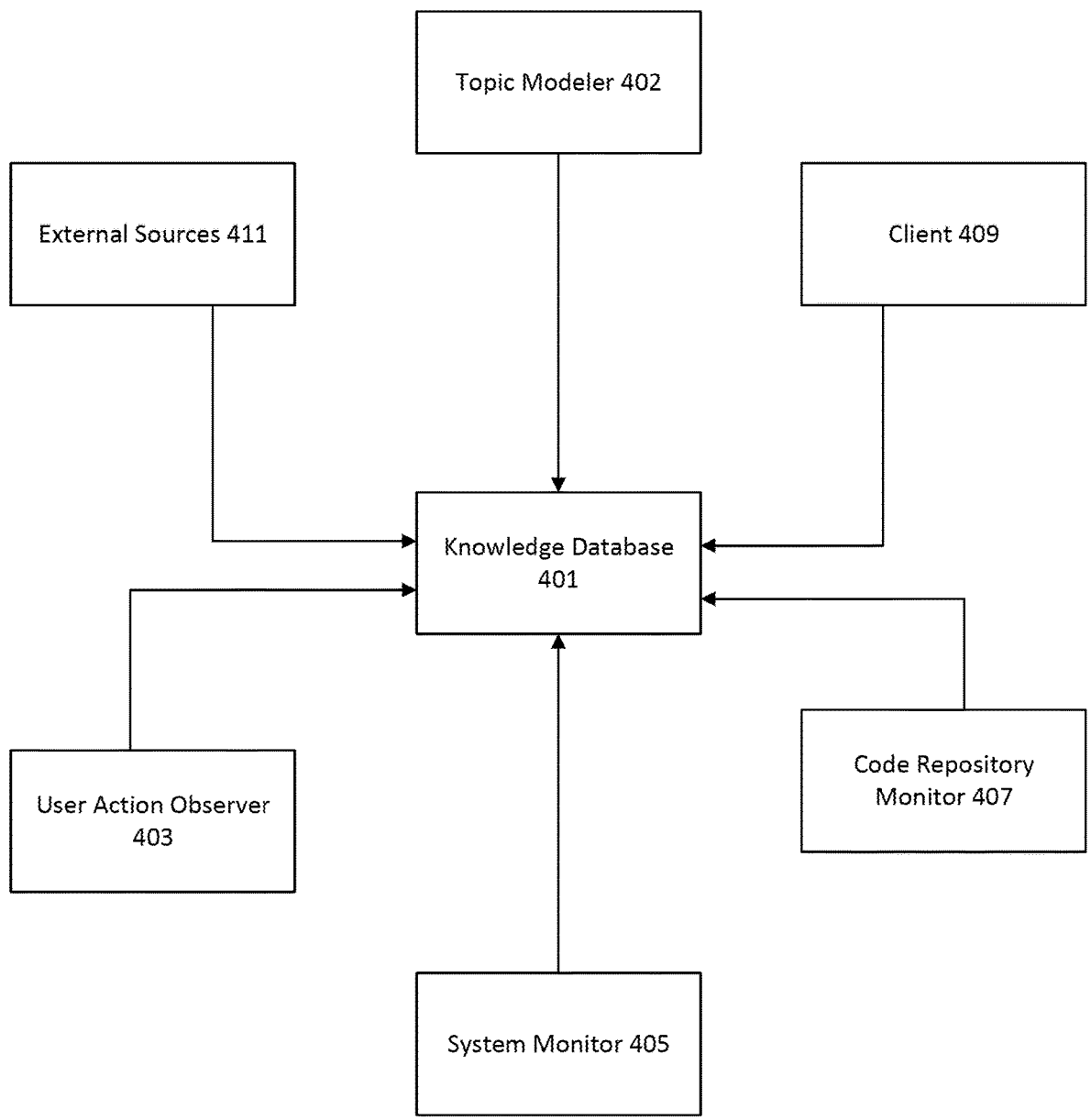
FIG. 4 illustrates a knowledge sharing system according to an embodiment.

FIG. 4 illustrates a knowledge sharing system 400 according to an embodiment. Knowledge database 401 is any kind of database or data store that is capable of storing and retrieving knowledge. In some embodiments, knowledge database 401 may be comprised of a relational database management system such as a SQL database, a non-relational data store such as MongoDB, a file system, or any combination thereof.

Knowledge is received from a variety of sources. For example, in the example illustrated in FIG. 4, knowledge is received by knowledge database 401 from user action observer 403, system monitor 405, code repository monitor 407, client 409, and external sources 411. In an embodiment, the user action observer 403, system monitor 405, and code repository monitor 407 may be components of monitoring system 380. In other embodiments, knowledge database 401 may receive knowledge from fewer or more sources.

User action observer 403 is a component that monitors a user's interactions with a computing system and infers knowledge from the user's interactions. For example, a user's inputs via a command line interface or graphical user interface may be monitored by user action observer 403. In an embodiment, a user action observer may be implemented as a software component which monitors a user's interactions with a programming environment such as programming environment 300.

System monitor 405 is a component that monitors aspects of a computing system that may not be captured by user action observer 403. For example, in an embodiment, system monitor 405 monitors a command line interface of a computing system and records inputs typed into a command line interface and outputs written to a command line interface from software being executed on the computing system. The system monitor 405 may also detect changes in the file system of the computing system, such as additions and deletions of files and directories.

Code repository monitor 407 is a system that monitors actions of a code repository. A code repository may implement a version control system such as but not limited to concurrent versions system (CVS), subversion (SVN), or GIT. A code repository may also maintain a historical record of past transactions with the code repository from various users. For example, a code repository may maintain a history of code check-ins, check-outs, merges, branches, comments, and other such transactional information about past events. Code repository monitor 407 may monitor or observe transactions with a code repository as they happen or import knowledge from historical transaction information of a code repository.

Client 409 may be any kind of computing client where a user may manually enter or edit knowledge in knowledge database 401. For example, a user interface may be provided on a client terminal for browsing, searching, entering, and editing knowledge in knowledge database 401. In an embodiment, the user interface may be provided via web browser, for example.

In some embodiments, additional sources of knowledge may be indexed or ingested into a knowledge sharing system in addition to those described above. External sources 411 include additional sources of knowledge that may be copied into the knowledge sharing system or linked to by the knowledge sharing system. Additional sources of knowledge include, for example, written communication between team members such as email messages and chat messages may be indexed by a knowledge sharing system. Team-maintained documentation about a code repository such as documentation in the code repository, system design documents, product specification documents, team guidelines, or standards may all be indexed by a knowledge sharing system.

As knowledge is ingested into knowledge database 401, topic modeler 402 analyzes the incoming knowledge and determines one or more topics of the knowledge. In some embodiments, a plurality of topics organized in a hierarchical manner may be determined for a piece of knowledge. Knowledge database 401 may then store the received knowledge and associate the knowledge with the one or more topics such that the knowledge may be browsed, searched, or retrieved according to topics. Moreover, users may edit the one or topics and their content by using client 409.

B. Knowledge Gathering

A knowledge system may receive knowledge from a variety of sources and store it in a single, unified knowledge database. For example, in the example illustrated in FIG. 4, knowledge is received by knowledge database 401 from user action observer 403, system monitor 405, code repository monitor 407, client 409, and external sources 411.

Figure 5:
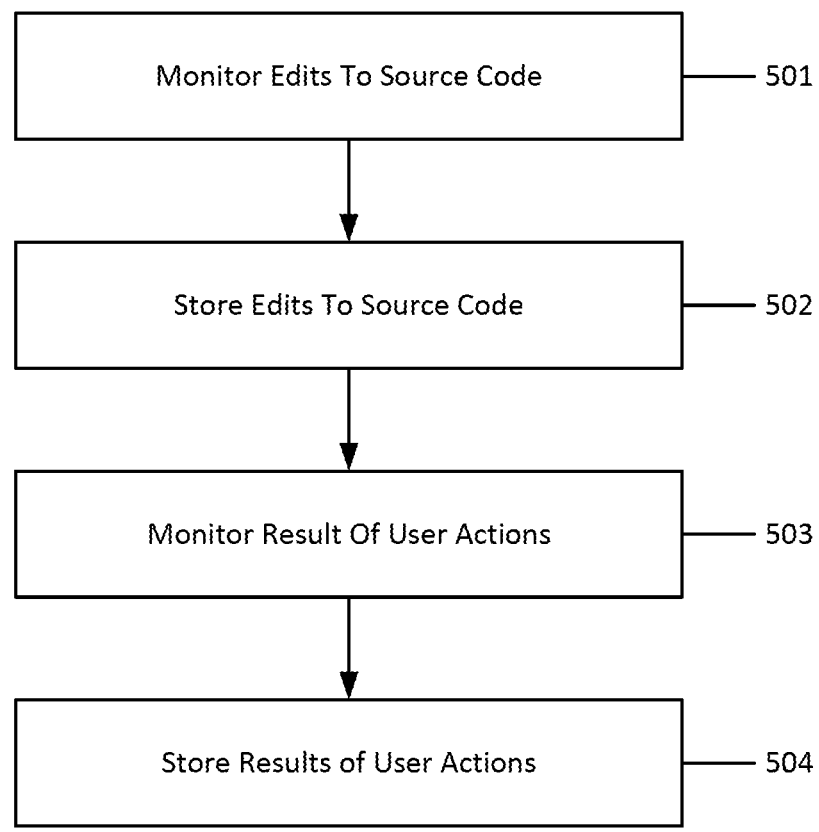
FIG. 5 illustrates the steps of a method for user action observation according to an embodiment.

FIG. 5 illustrates the steps of a method for user action observation according to an embodiment. A user action observer is a component that monitors a user's interactions with a computing system and infers knowledge from the user's interactions. The user action observer may monitor user actions both in the editor 302 and in other programs, such as, but not limited to, a web browser or the command line. For example, a user's inputs via a command line interface or graphical user interface may be monitored by a user action observer. In an embodiment, a user action observer may be implemented as a software component which monitors a user's interactions with a programming environment such as programming environment 340.

At step 501, a user action observation agent monitors accesses to source code in a programming environment. The term "accesses" to source code is used to mean edits, selects, and any other events that occur inside a code editor. The term "accesses" includes events like opening a new file, closing a file, opening or closing a tab, and any other user interaction in a code editor. In some embodiments, the user action observation agent may be implemented as a code editor add-on, plugin, or extension. The source code being accessed may be source code that is tracked by a code repository but is not yet check in to a repository. Examples of accesses to source code that may be observed by a user action observation agent include writing new code, deleting code, refactoring code, re-naming code entities, importing dependencies, and other such code accessing actions that may take place primarily within a code editor.

In an embodiment, the accesses comprise at least an edit event, a navigation event, or a selection event, or any combination of the foregoing. Examples of edit events include writing new code, deleting code, modifying code, and re-naming code, for example. Examples of navigation events include opening a file, closing a file, changing a working directory, moving a file, opening a tab, closing a tab, or other such navigation events. Examples of selection events include, for example, selecting a segment of source code, selecting a file containing source code, searching a codebase for source code responsive to a search query, or moving a cursor to a new location.

At step 502, the user actions observed by the user action observation agent are stored in an electronic journal in a time-series format comprising sequential data. Each user action is recorded and timestamped with a time that the action occurred. In this way, a progression of user actions over time may be constructed so that multi-step processes are discernable in the time-series format comprising sequential data.

At step 503, a user action observation agent monitors any result of a user action. In an embodiment, user actions may include directives issued to a programming environment such as a compiler, a linker, a parser, a linter, an interpreter, or other such tool that may be used in a programming environment. The user action observation agent may record the issuance of a directive and monitor the result of the directive. For example, the user action observation agent may monitor an action of a user issuing a command to a programming environment to compile a set of code, and then subsequently monitor a result of the compilation of the source code. A result of a compilation may be an indication of a successful compilation, or an indication of an error condition, for example.

In an embodiment, a user action may include an instruction to execute source code. In some embodiments, execution of source code may include the steps of compilation from one format to another, linking various executables, and initiating execution of a resulting executable. In some embodiments, execution of source code may include the steps of providing the source code to an interpreter and instructing the interpreter to execute the source code. The user action observation agent may monitor and record the result of execution of source code.

At step 504, the user actions observed by the user action observation agent are stored in an electronic journal in a time-series format comprising sequential data. Each user action and any results or responses to user actions are recorded and timestamped with a time that the action or response or result occurred. In this way, a progression of user actions over time may be constructed so that multi-step processes comprising causes and effects are discernable in the time-series format comprising sequential data. Complex user actions may be identified in this time-series format comprising sequential data. For example, cause and effect relationships between actions may be recorded in the time-series format.

Figure 6:
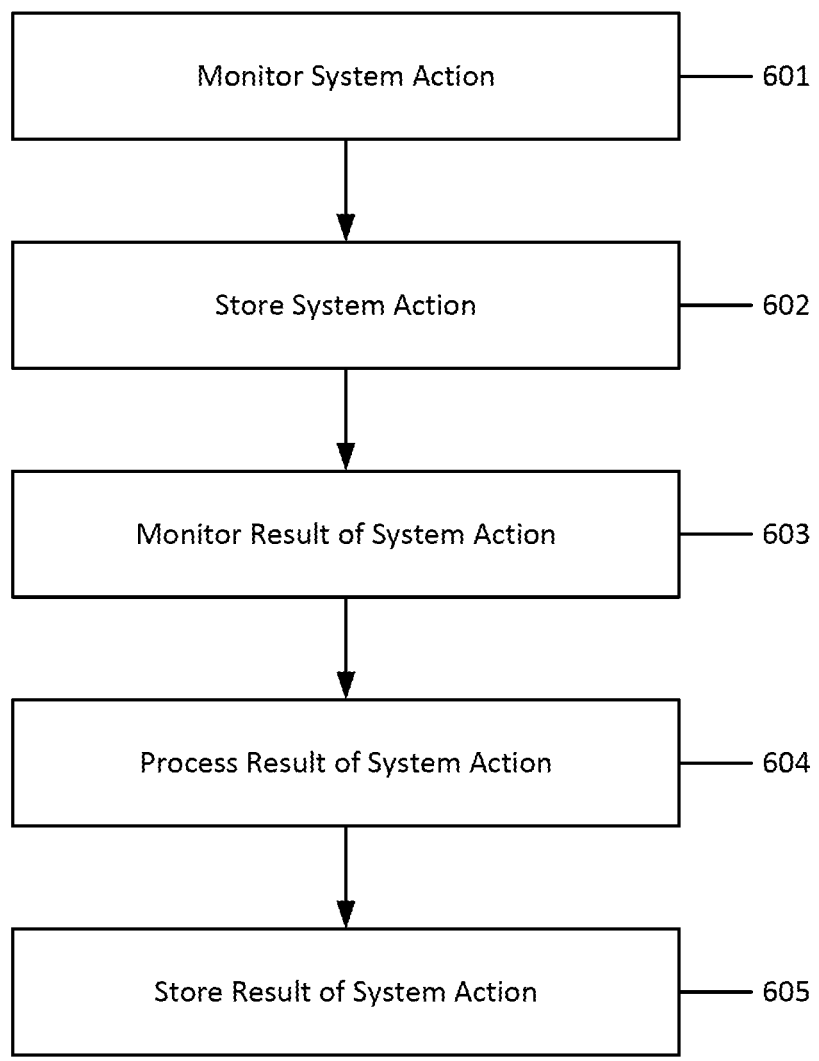
FIG. 6 illustrates the steps of a method for system monitoring according to an embodiment.

FIG. 6 illustrates the steps of a method for system monitoring according to an embodiment. A system monitor 405 is a component that monitors aspects of a computing system that may not be captured by a user action observer. For example, in an embodiment, a system monitor monitors a command line interface of a computing system and records inputs typed into a command line interface and outputs written to a command line interface from software being executed on the computing system. A command line interface may be any type of terminal, terminal emulator, or text-based read-eval-print loop of an operating system. In an embodiment where a user action observation agent is implemented as a code editor plugin, actions that occur outside of the code editor that the user action observation agent is attached to may not be visible or apparent to the user action observation agent. In such embodiments, a system monitor may be installed on a computing system that monitors events and actions at an operating-system wide level so that all user interactions with any portion of a computing system may be observed.

At step 601, a system monitor receives a system-level user action. An example of a system-level action is an interaction with an operating system terminal, for example. Another example of a system-level action may include, for example, user interactions through a graphical user interface of an operating system. User actions may include, for example, file system manipulation, execution of programs, settings modification, or other such system-level user actions.

In an embodiment, a system monitor may interface with an operating system API to gather and monitor terminal interactions. Additional heuristics may be employed to separate input and output in the terminal if necessary. In an embodiment, a system monitor may comprise a wrapper over a terminal interface that captures input and output of the terminal interface.

In an embodiment, a command input by a user to an operating system terminal is parsed to extract one or more commands types and parameters. For example, a command may be parsed into a syntax tree representation such as an abstract syntax tree representation or a concrete syntax tree. In some embodiments, a command may comprise an identification of an executable and one or more options, arguments, flags, or parameters passed to that executable.

In some embodiments, a command may be comprised of an identification of an executable, and identification of an action or verb of a function of that executable, and one or more options, arguments, flags, or parameters passed to that action or verb of the executable. For example, in the command "git add file.txt," the word 'git' identifies an executable, in this case the GIT version control system, 'add' identifies a function or action of the GIT version control system, and 'file.txt' is a parameter passed to the 'add' function of the GIT version control system.

The system-level user action is optionally parsed and, at step 602, stored in an electronic journal in a time-series format comprising sequential data. For example, a command entered into a terminal may be parsed into one or more layers or parts, and the command recorded in an electronic journal with a timestamp indicating when the command was entered into the terminal.

At step 603, a result of a system-level user action is received by the system monitor. A program invoked by a command line input may print a result, response, or reply to the command line interface of a terminal. For example, a status may indicate a successful addition to a code repository, or a result of the execution of an executable.

At step 604, the result of the system-level user action may be processed to determine a semantic meaning of the result. For example, an output of a program presented in a terminal may be parsed to detect an error code or a return code of the program. Error codes and return codes may be parsed to determine a successful completion of a command based on a return code, for example.

At step 605, the user actions observed by the user action observation agent are stored in an electronic journal in a time-series format comprising sequential data. Each user action and any results or responses to user actions are recorded and timestamped with a time that the action or response or result occurred. In this way, a progression of user actions over time may be constructed so that multi-step processes comprising causes and effects are discernable in the time-series format comprising sequential data.

Figure 7:
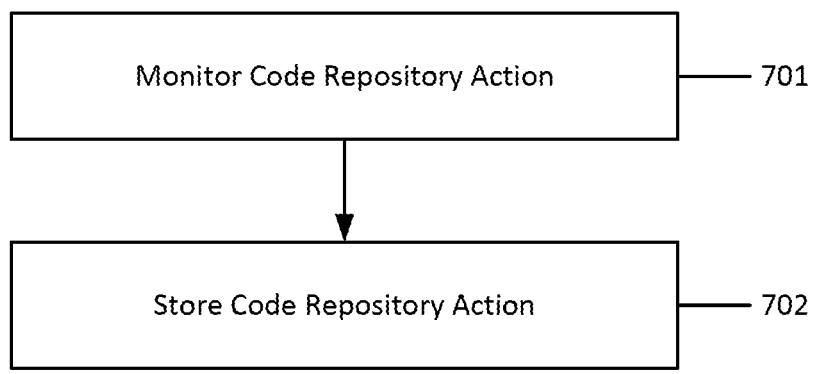
FIG. 7 illustrates the steps of a method for code repository monitoring according to an embodiment.

FIG. 7 illustrates the steps of a method for code repository monitoring according to an embodiment. A code repository monitor is a system that monitors actions of a code repository. A code repository may implement a version control system such as but not limited to concurrent versions system (CVS), subversion (SVN), or GIT. A code repository may also maintain a historical record of past transactions with the code repository from various users. For example, a code repository may maintain a history of code check-ins, check-outs, pull requests, merges, branches, comments, and other such transactional information about past events. Code repository monitor 407 may monitor or observe transactions with a code repository as they happen or import knowledge from historical transaction information of a code repository.

At step 701, a code repository monitor receives an indication of an action on a code repository. Examples of actions on code repositories include, for example, check-ins, checkouts, pull requests, branching, merging, and other such code repository functions. Some code repositories allow for a comment or name or other contextual information to be associated with an action. Such comments, names, or other contextual information may be received in conjunction with the indication of the action of the code repository.

In some embodiments, a code repository may be monitored in real-time and actions on the code repository recorded as they occur. In some embodiments, a historical records of past transactions and actions on a code repository may be analyzed and ingested by a code repository monitor.

At step 702, the code repository actions observed by the code repository monitor are stored in an electronic journal in a time-series format comprising sequential data. Each code repository action is recorded and timestamped with a time that the action occurred.

Knowledge received from a user action observer, system monitor, and code repository monitor may be aggregated into the same time-series format comprising sequential data. For example, timestamped knowledge or information from each source may be added to a common knowledge database such as knowledge database 401 and arranged along a common timeline. In this way, interactions and cause-effect relationships between knowledge received from disparate sources may be associated or connected. For example, a command entered into a terminal observed by a system monitor may be a prerequisite for a certain command issued to a programming editor as observed by a user action observer. Similarly, in this way information about the working state of a user's local code checkouts may be associated with other information or knowledge. For example, a user may check out code to a local client machine, which is observed by a code repository monitor, and then the user may make modifications to their local copy or branch of the code, as monitored by a user action observation agent in their local programming environment. The knowledge system may use this information to determine what the programmer is working on even though they have not yet check in their changes to the central repository. Information in the electronic journal may be later displayed to users as part of know-how retrieval. For example, information in the electronic journal may be added to one or more topics in the knowledge sharing system.

C. Editing Gathered Knowledge

In an embodiment, gathered knowledge may be edited prior to storing in a knowledge database.

Figure 8:
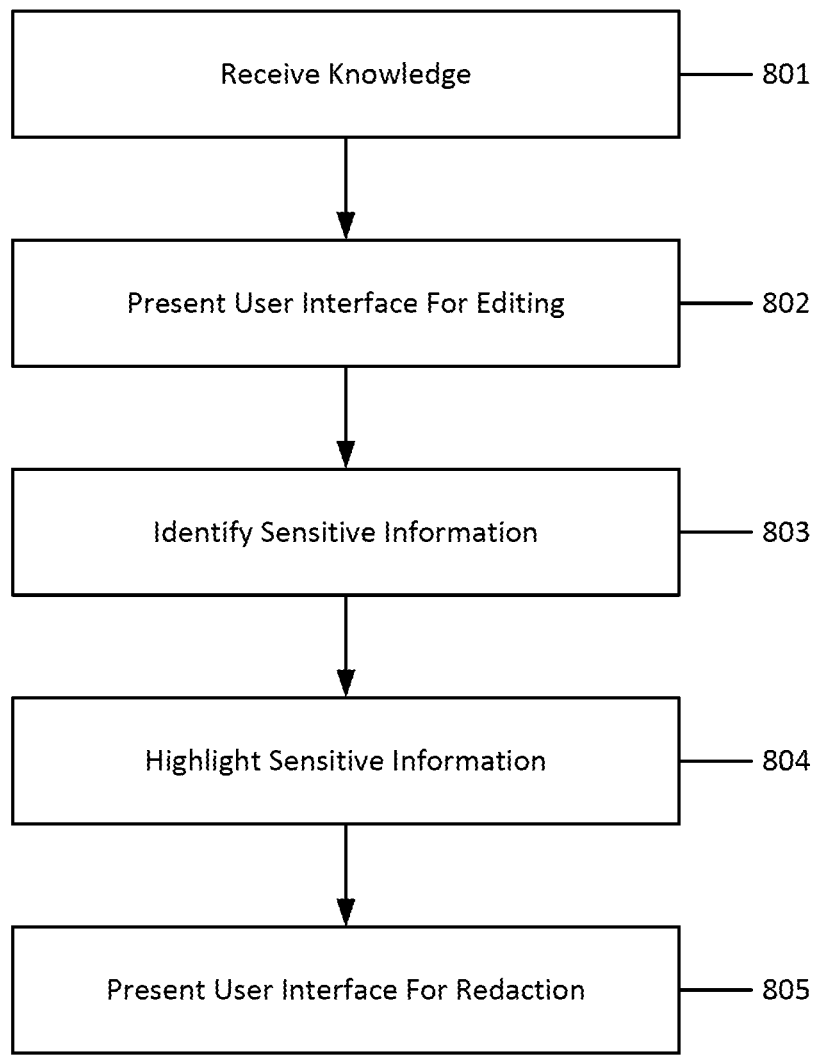
FIG. 8 illustrates the steps of a method for editing knowledge in a knowledge sharing system according to an embodiment.

FIG. 8 illustrates the steps of a method for editing knowledge in a knowledge sharing system according to an embodiment. At step 801, a piece of knowledge is received by the knowledge sharing system. At step 802, a user interface is presented to a user for editing time-series information received by the knowledge sharing system. In an embodiment, time-series information received by the knowledge sharing system may include information about one or more edits made to source code, for example. In another embodiment, time-series information received by the knowledge sharing system may include information about a series of commands entered into a terminal by a user, for example.

At step 803, data in the time-series information is identified as sensitive based on a prediction from a machine learning model. For example, a machine learning model may be trained to identify sensitive information such as passwords, usernames, connection strings, names, financial information, production data, or other such sensitive information.

At step 804, the identified sensitive information may be highlighted in the user interface. At step 805, a user interface is displayed for editing the sensitive information such as removing or redacting the sensitive information. In other embodiments, the sensitive information is automatically deleted or masked by the system, without requiring interaction from the user.

In some embodiments, a user may be prompted upon the creation of a topic to add user-edited information about the topic. For example, when a topic is created, a user interface may be displayed to the user to edit or append additional information to the topic. Additional information may include a title, description, notes, links to more information, and other content, whether structured or unstructured text or multimedia. A user may similarly be able to direct the knowledge sharing system to join the generated topic with another topic or omit the generated topic entirely.

D. Additional Sources of Knowledge

In some embodiments, additional sources of knowledge may be indexed or ingested into a knowledge sharing system in addition to those described above. Additional sources of knowledge may be copied into the knowledge sharing system or linked to by the knowledge sharing system. Some additional sources of information may not be time-oriented. That is, they may not be included on the common timeline but organized under topic. For example, written communication between team members such as email messages and chat messages may be indexed by a knowledge sharing system. Other forms of communication such as video conferences and phone calls may also be indexed in the knowledge sharing system. Team-maintained documentation about a code repository such as documentation in the code repository, system design documents, product specification documents, team guidelines, or standards may all be indexed by a knowledge sharing system.

Existing knowledge stores may similarly be indexed by the knowledge sharing system. For example, wikis, question and answer platforms such as StackOverflow or Quora, discussion forums, or other such sources of knowledge may be indexed by the knowledge sharing system.

Workflow or project management sources of data may be indexed by the knowledge sharing system. For example, bug reports, issues in an issue tracker, pull requests, tasks cards, or other such project management sources may be indexed by the knowledge sharing system.

Analytics and reporting services including crash reporting services such as Crashlytics, server monitoring services such as New Relic, user analytics platforms such as Google Analytics, customer service platforms such as ZenDesk, and social media monitoring platforms such as Hearsay Social may all have information or data that may be indexed by the knowledge sharing system as well.

E. Guided Knowledge Contribution

One additional source of knowledge may be manually entered knowledge. For example, a user may write a document pertaining to a particular topic to be included in the knowledge system. Users may manually author documentation at any time and enter it into the knowledge sharing system. In an embodiment, the knowledge sharing system may suggest to users to contribute to a particular topic or set of topics based on the frequency that the topic is encountered by other users, the frequency that the topic is viewed by other users, the amount of existing information on the topic, the rate at which users contribute to the topic when prompted, or a computed value of the time of the user. The knowledge sharing system may suggest topics to a user based on, among other factors, whether or not the system deems the user an expert in the topic, the user's familiarity with the topic, the importance of the topic, how often the topic comes up in coworkers' workflows, how often the topic is explicitly referenced, how much time in aggregate his coworkers spend on the topic, how much knowledge is already written down for that topic, how many experts there are at the company currently on that topic, how available other experts at the company are, or how much content about the topic exists in the knowledge sharing system or in other systems. In an embodiment, guided knowledge contribution may be used for employees who are departing a company. The knowledge sharing system may read stored information about the employee's upcoming departure and may automatically initiate guided knowledge contribution process for the employee. The knowledge sharing system may guide the process of the employee to write documentation or input knowledge and may prioritize topics for entering of documentation based on importance. In another embodiment, guided knowledge contribution may be used for employees who are currently at a company. The knowledge sharing system may detect a high-leverage opportunity where a user can enter information that would be valuable to record. In other embodiments, the knowledge sharing system may have regularly occurring processes for guiding knowledge contribution from employees. When initiated, the knowledge sharing system may guide the process of the employee to write documentation or input knowledge and may prioritize topics for entering of documentation based on importance.

F. Topic Modelling

Once knowledge has been ingested into a knowledge sharing system, the knowledge sharing system may determine one or more topics of the knowledge and store the knowledge associated with those one or more topics in a knowledge database. In some embodiments, the topics may be determined by a machine learning model, such as a learning algorithm or rule-based system. In this way the knowledge sharing system organizes knowledge according to topics and makes knowledge available by topic.

A knowledge system may aggregate information from a plurality of users and a plurality of different sources for each user. For example, knowledge received from a plurality of user action observers observing actions of a plurality of users, any of the external data sources mentioned in Section D and elsewhere herein, a plurality of system monitors observing system-level actions of a plurality of client computing devices, and a plurality of code repository monitors monitoring a plurality of code repositories, each of which is contributed to by a plurality of users may be aggregated into the same time-series format comprising sequential data. From this aggregated data, the knowledge sharing system may determine topics for various collections of actions.

Actions may be grouped by user, by time, by subject matter or content, or a combination thereof.

In an embodiment, a topic modeler may generate a topic related to a particular code entity reference in the recorded knowledge timeline. For example, code accesses pertaining to a common code entity may be associated under a topic. Accesses pertaining to the code entity may be user actions observed by a user action observation agent or code changes checked in to a code repository as observed by a code repository monitor, for example. Accesses to the same code entity may be associated across users and time such that all accesses to a particular function, file, or other piece of code may be grouped under a common topic. For example, all accesses to an encryption function may be associated under the topic of encryption in a knowledge database.

In an embodiment, a topic modeler may generate a topic for actions that occur within a set period of time. For example, all check-ins to a code repository from a plurality of users during a period of time may be grouped under a common topic. As an examples, a topic may be all activity for a particular 'sprint' or other project management time period delineation.

Similarly, a particular user's or a group of users' actions that occur in quick succession may be grouped as a topic. For example, a user may edit a segment of code, enter a terminal command, and then check in the segment of code that was edited. These actions may all be associated by their temporal relationship. In an embodiment, the collected actions may be referred to by a time designation, such as "Monday Afternoon." In an embodiment, the collected actions may be analyzed to determine a semantic label related to the content of the actions. For example, a machine learning system may be used to determine frequently used terms, unique terms or words, or other important semantic meaning that may be extracted from the knowledge in the knowledge database.

In an embodiment, frequency of events or actions in the knowledge database may be an indication of a topic. For example, a particular command entered into a terminal interface may be a topic. A topic modeler may group events that co-occur more frequently than a threshold rate of occurrence into a single topic. For example, among a team of users it may be common to execute a similar set of commands. As an example, programmer users may edit a particular source code file to modify a database migration, and then execute a related command in a terminal to perform the database migration. This co-occurrence of a related set of actions may be identified as a grouping of actions under a common topic. A machine learning model may be used to determine a title or reference for the topic based on the content of the knowledge database. In an embodiment, a machine learning model may suggest words that are unique in the knowledge database but occur frequently in the actions grouped under the common topic. For example, in the database migration example, a topic modeler may suggest a topic title of "database migration" for the topic.

In some embodiments, a plurality of topics for a piece of knowledge may be determined. In an embodiment, a topic and sub-topic of a command entered into a terminal may be determined based on the content of the command. For example, a first-level topic may be related to the executable invoked in a command, and a second-level topic may be related to an action or verb of the executable invoked by the command. A plurality of topics may be organized in a hierarchical structure so that topics may be associated as sub-topics under an umbrella topic.

Topics for other sources of knowledge may be determined by a machine learning system such as probabilistic latent semantic analysis (PLSA) or latent Dirichlet allocation (LDA) machine learning topic modelling systems. In some embodiments, a ranked list of topics for a document or piece of knowledge may be produced by a machine learning system, and the piece of knowledge indexed by topic and sub-topic accordingly. Knowledge and information from other sources, including the data sources mentioned in Section D and elsewhere herein, may also be indexed under the same topic structure. For example, a StackOverflow page may be organized under the same topic as a record of a user's interactions in a code editor or check-ins to a code repository. Topics and information may be related in a many-to-many relationship, where each topic may encompass many pieces of content and each piece of content may be associated with multiple topics.

In some embodiments, knowledge and topics in a knowledge sharing system may be edited by users. For example, a user may be presented with an interface to edit a topic to add user-edited information about the topic. Users may edit any aspect of a topic, including a title or reference name of a topic, a description of a topic, a collection of knowledge organized under the topic, links to additional topics related to the topic, or any other aspect of the knowledge or topics stored in a knowledge sharing system.

G. Domain Expertise

In some embodiments, the actions or knowledge received and aggregated by a knowledge sharing system may be associated with particular users. For example, a code check-in may be associated with a particular user, and system and user action monitors are installed on particular user's machines. This user information may be used to determine users who are associated with various topics. In some embodiments, users may be identified as domain experts for a topic based on a frequency of contributions to knowledge associated under the topic.

For example, users may be rated or ranked on their contributions to a topic by authorship of code or documentation related to the topic, frequency of code pull requests related to the topic, frequency of team communications about the topic, frequency of code submissions related to the topic, length of time involved in the topic, or number of subtopics of the topic that the user is involved in.

In an embodiment, a user's expertise on a topic may be rated by a measure of their contributions to the topic. One example of a user's contributions to a topic may be the quantity of code associated with the topic that a user has edited. Another example of a measure of a user's contributions to a topic may include a count of the number of times the user has created a pull request for code related to the topic. In some embodiments where additional sources of knowledge are indexed by a knowledge sharing system, a user's contributions among those additional sources of knowledge may be used as a measure of the user's expertise related to the topic. For example, a number of Quip documents that the author has written about a topic or the number of Slack conversations about a topic may be used as a measure of expertise about the topic.

In an embodiment, a user's expertise on a topic may be rated by a measure of their contributions to sub-topics organized under the topic. In this way, even if a user has contributed little to a topic, if they have extensive contributions to one or more sub-topics, they may be determined to have relevant expertise in the umbrella topic as well. In some embodiments, a user's contribution to a number of distinct sub-topics may be used as a measure of expertise in an umbrella topic as well, even if the quantity of the contributions may be comparatively low.

In some embodiments, the time associated with a user's contributions to a topic may be used as a measure of expertise. For example, the original author of a section of code may be a relevant expert in the code even if their subsequent contributions are eclipsed by another user. Similarly, if a user has made an increasing proportion of contributions to a topic over time, they may be determined to be an expert in the topic as well.

H. Knowledge System Interfaces

The knowledge sharing system may be accessed or interfaced with through various different touchpoints. In some embodiments, the knowledge sharing system may be accessed via a web interface. The knowledge sharing system may be browsable by topic or keyword or queried by keyword or natural language search.

Figure 9:
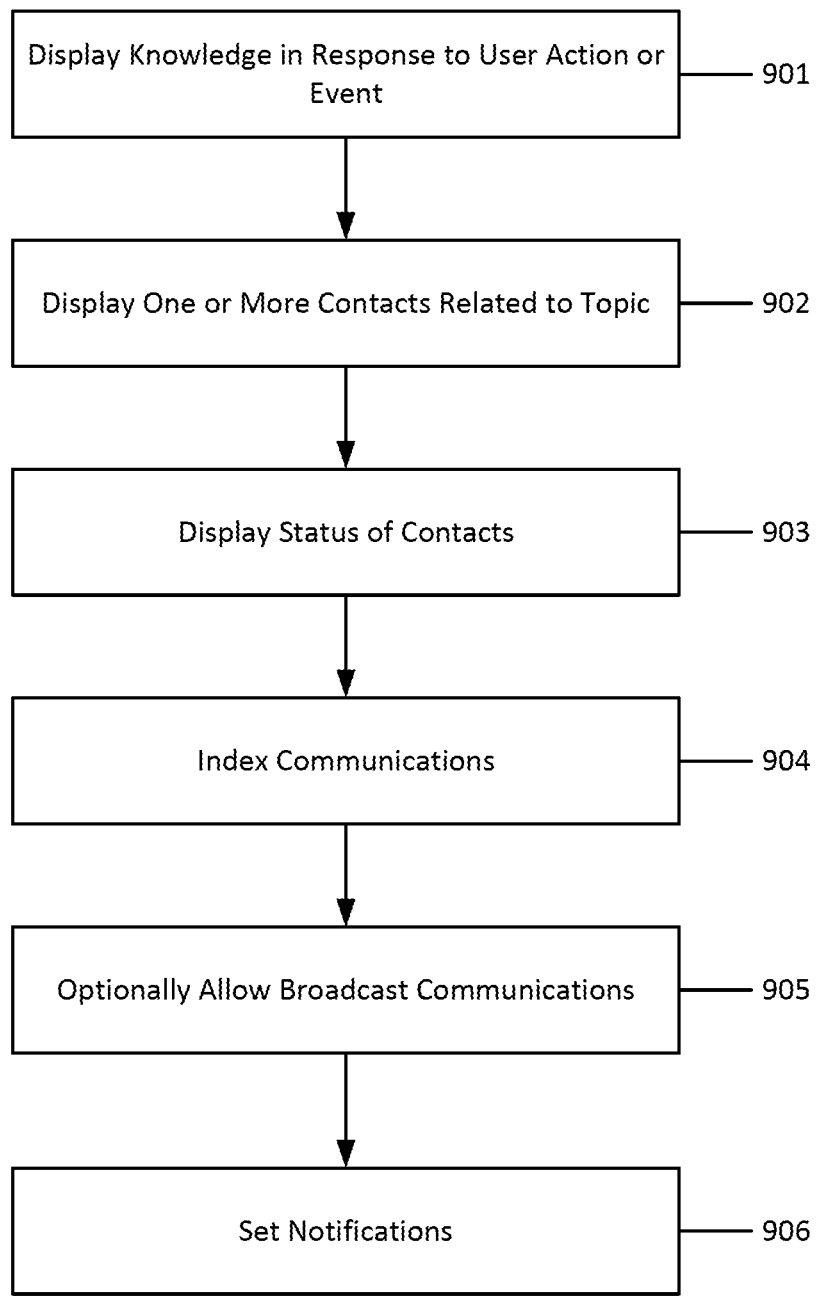
FIG. 9 illustrates the steps of a method for providing access to a knowledge sharing system.

FIG. 9 illustrates the steps of a method for providing access to a knowledge sharing system. Some interfaces to the knowledge sharing system may be automatically invoked in response to some user action.

For example, in an embodiment, if a programmer hovers their mouse over a code entity in their code editor, the knowledge sharing system may perform a search for the code entity in the knowledge sharing system and display links to topics related to the code entity. Similarly, if a programmer writes code to invoke a function or code entity, the knowledge sharing system may perform a search for the function name or code entity in the knowledge sharing system and display links to topics related to the function name or code entity.

In an embodiment, a user's edits to a local version of a codebase may be displayed when the user checks in their local version. In an embodiment, the edits to the local version may be displayed to other users, prior to a checking in of the local version to the remote code repository.

In step 901, in an embodiment, any user actions or events that are related to a topic may prompt the knowledge sharing system to display knowledge already in the knowledge database related to the topic. For example, if a system monitor agent observes a user entering a set of commands into a terminal, a topic related to the set of commands may be displayed for the user in a programming interface. In another example, if a certain output of a program indicates an error condition, a search may be performed on the knowledge sharing system for topics related to the program to assist the user in addressing the error. In another example, content of a chat or email message may be parsed to determine search terms to search the knowledge base automatically and present the topics most likely to contain the answer to the team member.

In step 902, in some embodiments, when a topic is automatically displayed to a user in response to the user's actions, an indication of one or more other users or contacts related to the topic may be displayed along with the topic. These users may be classified as domain experts for the topic by the knowledge sharing system. For example, a user's expertise as described above may be used to identify which user's contact information to present along with display of a topic. Moreover, expertise may also be used to rank and sort the user's for display to the user, with more experienced users presented before less-expert users. Users may be awarded numerical ratings of their expertise based on any of the measures of expertise described in section G and elsewhere herein. In one approach, numerical values are awarded for each measure of expertise and the numerical values are combined, such as in a linear or non-linear combination, to obtain final resulting score. In some embodiments, a machine learning system may be used to assign expertise scores to users, where the machine learning system is trained based on example features related to expertise, such as those identified in Section G, and their association to actual expertise as measured by quantifications of usefulness of contributed content or answers. A user interface may be presented to facilitate submitting a question or comment directly to an expert associated with the topic.

In step 903, in some embodiments, a presence or current status of users contact information displayed in a topic may be determined and displayed with the expert user's contact information to facilitate communication. Examples of presence or status indications include, for example, a user's employment status (e.g., whether they are still employed at the company), a user's presence at a computer, a user's self-indicated presence indicators such as 'do not disturb' or 'in a meeting,' a priority of the task the user is currently working on, a comparison of the priority of the task the user is currently working on versus the priority of the task the requester is working on, a prediction of whether the user is in a flow state, whether the user is currently working in an area of code that the requester is asking about, and an identification of code that the user may be currently working on.

In step 904, in some embodiments, any communications initiated through the interface may be indexed in the topic that prompted the communication. For example, if a user is presented with a topic and sends a message to an expert associated with the topic, the ensuing discussion may be tracked and indexed as a part of the knowledge associated with the topic.

In step 905, in some embodiments, a plurality of users may be associated with a topic, and a user may be able to broadcast a message to the plurality of users in parallel in the case of urgent requests or inquiries. In some embodiments, the plurality of expert users may be attempted to be contacted sequentially, ranked based on any status or presence indicators as discussed above. The knowledge sharing system or the user may elect to contact the users in parallel or sequentially based on the urgency or priority of the task. The user receiving the message may be informed of the message synchronously or asynchronously. In a synchronous method, the message is shown to the user immediately and may interrupt the user in their current task. In an asynchronous method, the message may be buffered until the user is detected to reach a natural resting point, such as when they are coming out of a flow state. This may be detected when the user has returned to their computer after time away, the user has just completed pushing code, the user has just opened a pull request, or other states. A user receiving a message about a topic may accept or decline a request to assist. For example, if the user is working on an important task or is in a flow state, then it may make sense for the user to decline the request. The user may optionally send a message to indicate that they are declining or may suggest another user to contact.

In step 906, in some embodiments, a user may indicate a desire to be notified about changes to a topic. In one embodiment, notifications may be opt-in, but in other embodiments, users may be automatically subscribed to certain notifications. Notifications may be delivered via any communication method such as email, chat, newsfeed, or text message. The notifications may be delivered synchronously and interrupt the user or may be batched into summaries. In some embodiments, notifications from subscribed topics may be aggregated and presented to a user in an aggregated format such as a news feed, RSS feed, or ATOM feed, for example. In some embodiments, topics may be suggested to users based on user engagement data. The system may use user engagement information such as which topics the user interacted with by performing actions, such as searching for, opening, or viewing a topic, to determine topics the user is interested in. Moreover, for example, if a user views a certain topic frequently, that topic may be suggested to be included in the user's aggregated feed of topic updates. By monitoring user actions, the system may detect the topics that a user frequently encounters in his day-to-day work. When the user does not engage with a topic that is displayed, the topic may be ranked lower and shown less frequently.

In some embodiments, notifications are sent to a user based on changes being made to a sensitive part of the codebase. In an embodiment, certain parts of the codebase may be designated sensitive. One or more users may configure their notification settings to receive a notification when a change is made to that part of the codebase. In other embodiments, users are automatically notified of changes to sensitive parts of the codebase without opting in. Similarly, notifications may be sent to one or more users based on increased frequency of errors in code. The increased frequency of errors may be detected in production or development versions of code. Moreover, notifications may be sent to one or more users based on code execution being slow. The speed of code may be measured by wall clock or CPU time and compared to the speed of prior versions of the code.

Figure 10:
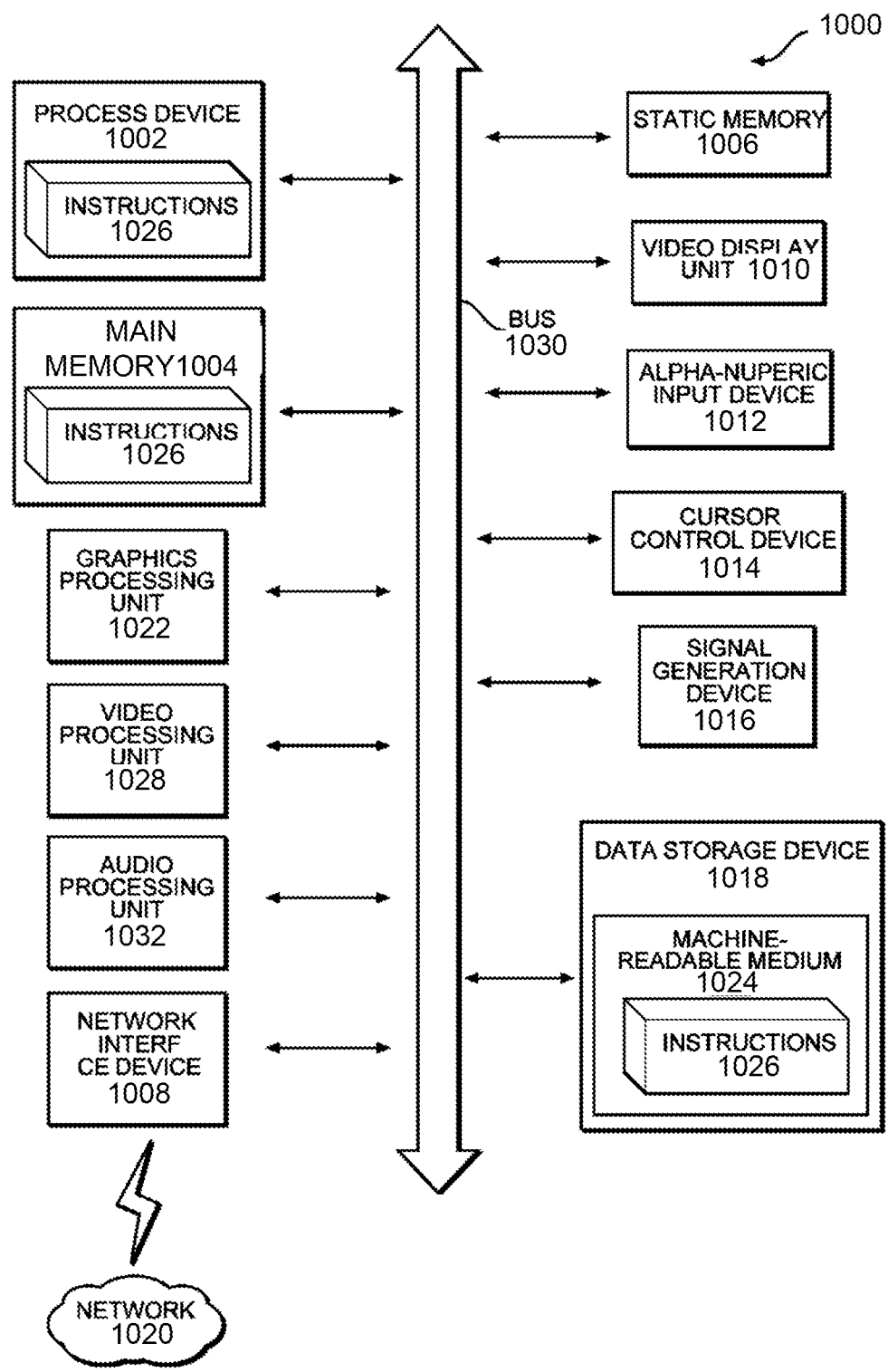
FIG. 10 illustrates an example machine of a computer system within which a set of instructions, for causing the machine to perform any one or more of the methodologies discussed herein, may be executed.

FIG. 10 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1015 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a computer-readable medium) on which is stored one or more sets of instructions or software 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In one implementation, the instructions 1026 include instructions to implement functionality corresponding to the components of a device to perform the disclosure herein. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   retrieving time-series information about an edit made to source code;
   identifying one or more topics for the edit based on a code entity or a parameter included in the edit;
   displaying the time-series information and the one or more topics to a user;
   displaying a user interface for editing and annotating the time-series information about the edit made to source code;
   identifying data in the time-series information as sensitive based on a prediction from a machine learning model;
   highlighting the data identified as sensitive; and
   providing a user interface element for changing a status of the data to sensitive or not sensitive.

2. The computer-implemented method of claim 1, further comprising:
   displaying the user interface element for the user to add user-edited information about the one or more topics.

3. A computer-implemented method comprising:
   retrieving time-series information about an edit made to source code;
   identifying one or more topics for the edit based on a code entity or a parameter included in the edit;
   displaying the time-series information and the one or more topics to a user; and
   computing an expected utility of prompting the user for entry of additional information about the one or more topics.

4. The computer-implemented method of claim 3, further comprising when the expected utility exceeds a threshold, displaying a user interface element for the user to add user-edited information about the one or more topics.

5. The computer-implemented method of claim 4, wherein the expected utility is based on a frequency that a topic is encountered by other users, a frequency that the topic is viewed by other users, an amount of existing information on the topic, a rate at which users contribute to the topic when prompted, or a computed value of a time of the user.

6. A computer-implemented method comprising:
   retrieving time-series information about a command entered in a terminal, wherein the command is multi-layered;
   parsing the command into one or more layers;
   identifying one or more topics for the command based on the one or more layers;
   displaying the time-series information or the one or more topics to a user;
   displaying a user interface for editing and annotating the time-series information about one or more edits made to source code;
   identifying data in the time-series information as sensitive based on a prediction from a machine learning model;
   highlighting the data identified as sensitive; and
   providing a user interface element for changing a status of the data to sensitive or not sensitive.

7. The computer-implemented method of claim 6, further comprising:
   displaying the user interface element for the user to add user-edited information about the one or more topics.

8. A computer-implemented method comprising:
   retrieving time-series information about a command entered in a terminal, wherein the command is multi-layered;
   parsing the command into one or more layers;
   identifying one or more topics for the command based on the one or more layers;
   displaying the time-series information or the one or more topics to a user; and
   computing an expected utility of prompting the user for entry of additional information about the one or more topics.

9. The computer-implemented method of claim 8, further comprising when the expected utility exceeds a threshold, displaying a user interface element for the user to add user-edited information about the one or more topics.

10. The computer-implemented method of claim 9, wherein the expected utility is based on a frequency that a the topic is encountered by other users, a frequency that the topic is viewed by other users, an amount of existing information on the topic, a rate at which users contribute to the topic when prompted, or a computed value of a time of the user.

\* \* \* \* \*